May 4, 1965 E. M. PAUWELS ETAL 3,181,295
OPERATOR AND SPEED CONTROLLED ACTUATOR FOR TURBINE GUIDE BLADES
Filed Oct. 15, 1962 3 Sheets-Sheet 1
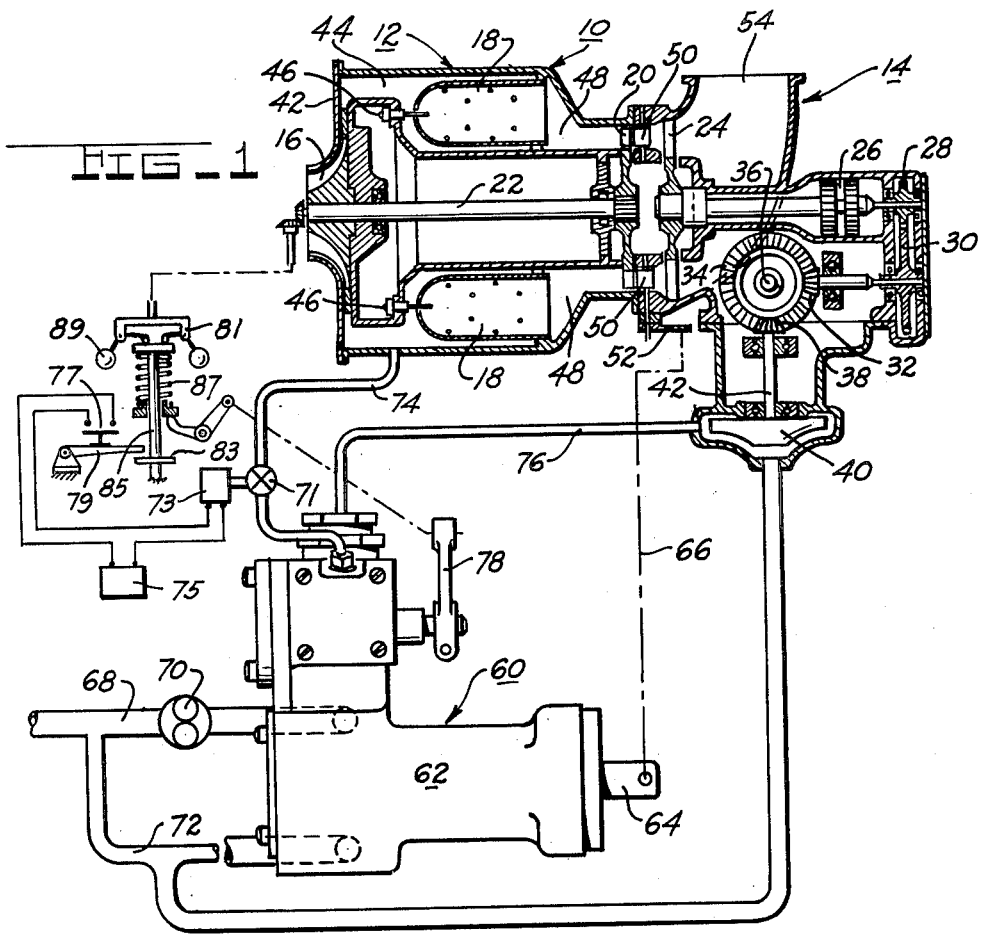
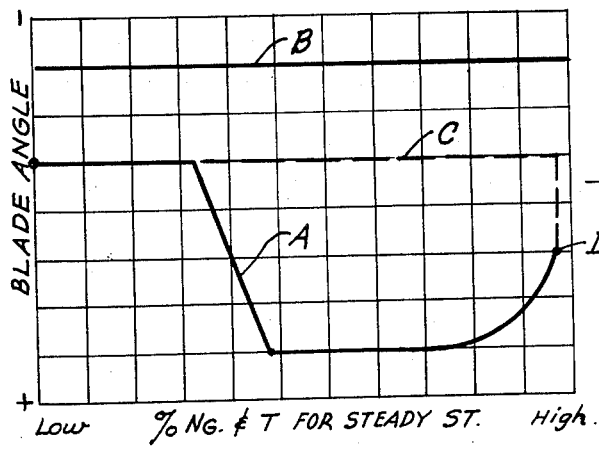
INVENTORS
EDWARD M. PAUWELS.
WILLIAM J. KESTERMEIER.
BY
ATTORNEY.

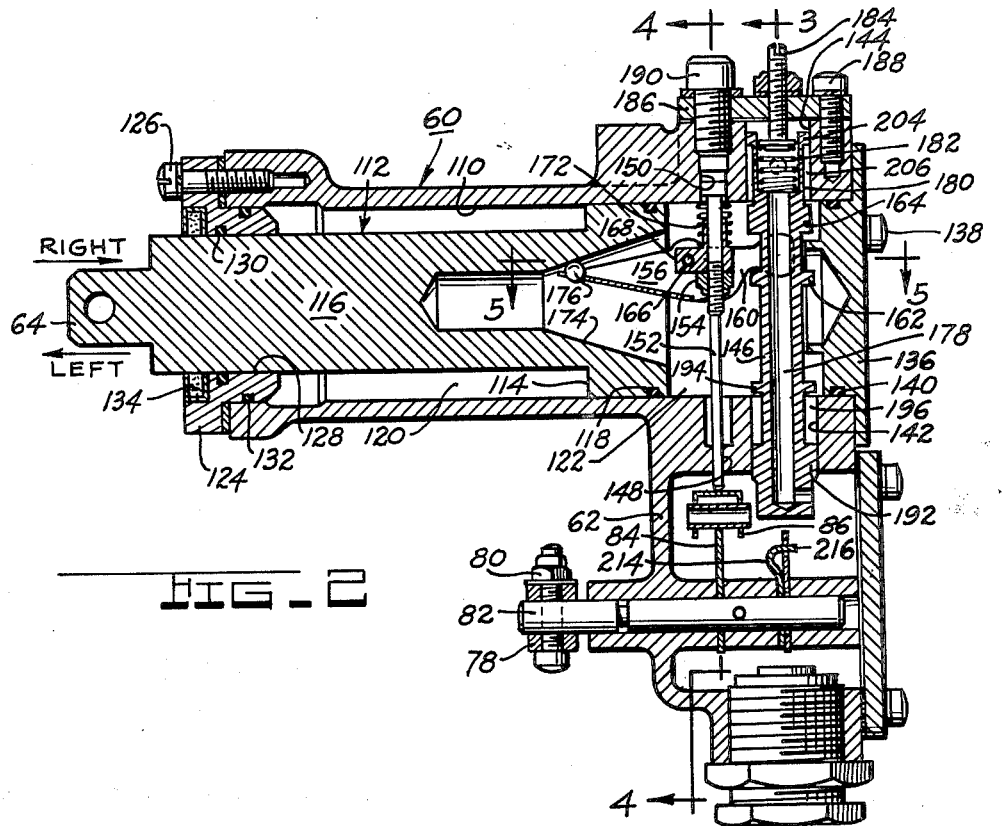
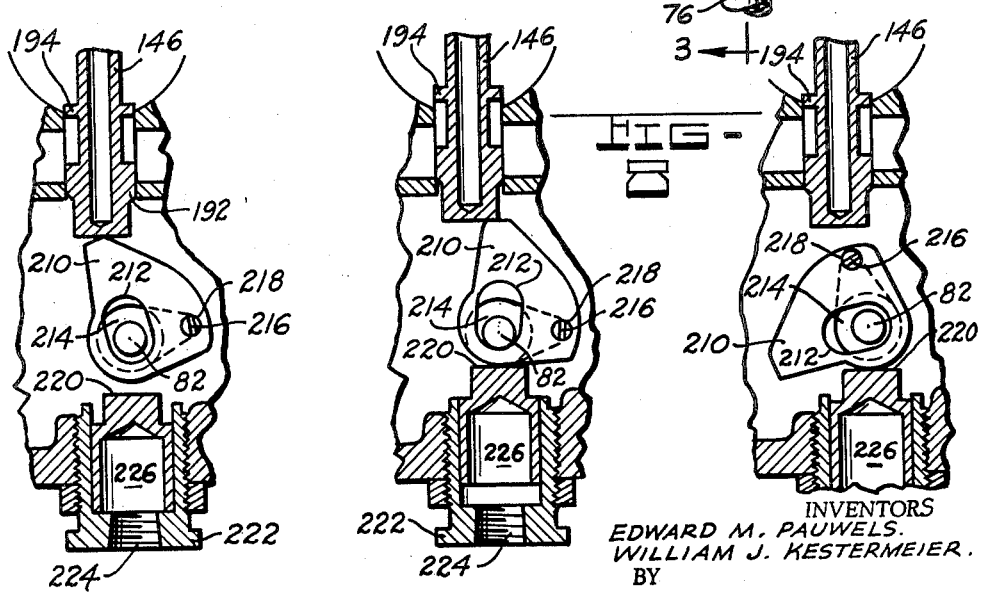

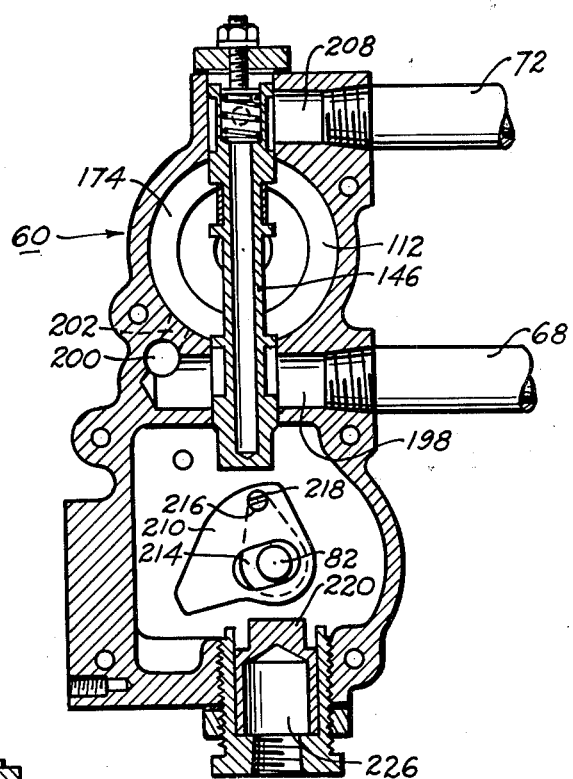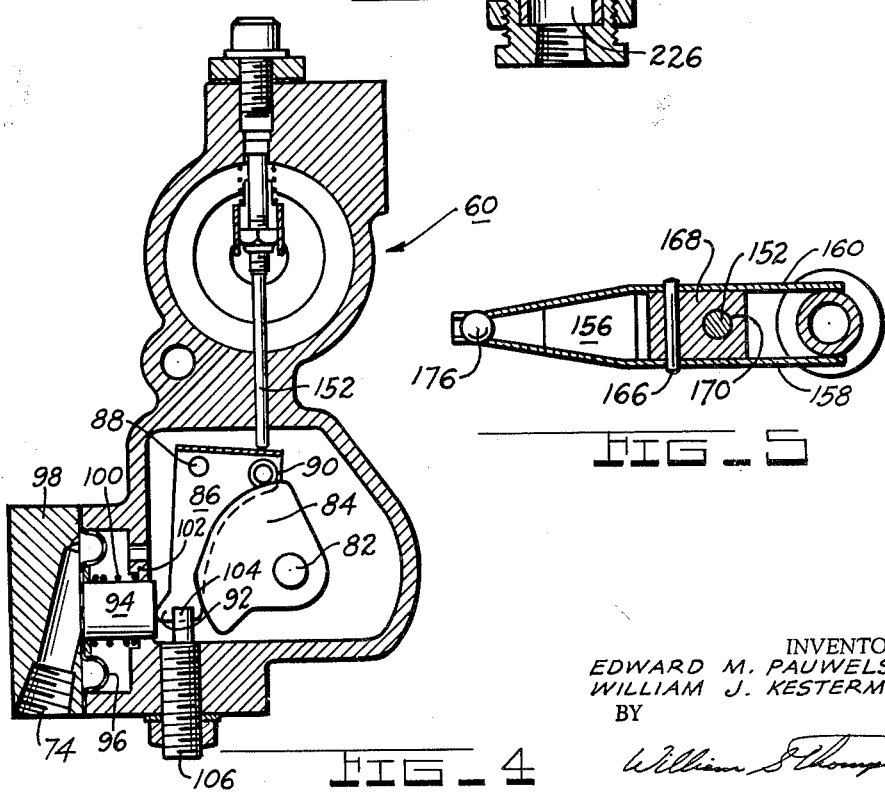

3,181,295
OPERATOR AND SPEED CONTROLLED ACTUATOR FOR TURBINE GUIDE BLADES
Edward M. Pauwels and William J. Kestermeier, South Bend, Ind., assignors to The Bendix Corporation, South Bend, Ind., a corporation of Delaware
Filed Oct. 15, 1962, Ser. No. 230,581
7 Claims. (Cl. 60—39.16)

The present invention relates to a vane actuator and more particularly to a hydromechanical actuator device adapted to control movable engine control elements such as variable position turbine blades or vanes of a gas turbine engine.

It is an object of the present invention to provide a vane actuator of reliable and low cost design suitable to meet the needs of the automotive gas turbine field.

It is a further object of the present invention to provide a vane acutator for positioning gas turbine engine power turbine stator blades in the various engine operating ranges of acceleration, deceleration, steady state and braking in response to one or more input conditions.

It is a still further object of the present invention to provide a vane actuator wherein one precision machined bore provides both a servo piston bore and pilot valve fluid ports so as to reduce insofar as possible expensive machining steps.

It is another object of the present invention to provide a vane actuator having a servo piston with integrally formed feedback cam.

Other objects and advantages of the present invention will become apparent on consideration of the description and drawings wherein:

FIGURE 1 is a schematic system view of gas turbine engine and vane actuator;

FIGURE 2 is a main section view of a preferred embodiment of the vane actuator of the present invention;

FIGURES 3 and 4 are section views of the vane actuator of the present invention taken along section lines 3—3 and 4—4, respectively of FIGURE 2;

FIGURE 5 is a partial section view of a feedback lever taken along section lines 5—5 of FIGURE 2;

FIGURES 6, 7 and 8 are fragmentary section views of braking cam and pilot valve shown more completely in FIGURE 3 showing different operating positions; and, FIGURE 9 is a graph illustrating typical performance characteristics of the present invention.

Referring particularly to FIGURE 1, numeral 10 designates a gas turbine engine having a gasifier section 12 and a power section 14. Gasifier section 12 includes a compressor 16, combustion chambers 18, and a turbine 20 which drives compressor 16 through a shaft 22. The power section 14 includes a turbine 24, clutch 26, transmission gearing 28, 30, 32 and 34 and a drive shaft 36 for driving a load such as automobile wheels. Gearing 38 drives pump 40 through shaft 42 in proportion to automobile wheel speed to produce a fluid pressure control signal proportional to wheel speed which is one input to our actuator.

Air flows into the engine through inlet 42 to the compressor 16 wherein it is pressurized and discharged into an annular duct 44 and thence into the combustion chambers 18. Fuel is supplied by a source, not shown, to individual fuel nozzles 46 where it is burned with the pressurized air, producing combustion products discharging through annular duct 48 to turbine 20. As the combustion products pass through turbine 20 a portion of the energy is extracted to drive compressor 20. A plurality of movable turbine stator or guide vanes 50 are annularly arranged at the downstream side of turbine 20 to control the direction of flow of combustion gases. The stator vanes may be mutually geared or linked together so as to be uniformly positionable in response to movement of lever 52. Combustion gas guided by vanes 50 pass through turbine 24 where substantially the balance of usable energy is extracted driving the engine load. Spent gases are exhausted through exhaust pipe 54 or if desired, may be circulated through a heat exchanger for greater economy.

In an engine of the type described, performance can be significantly improved by positioning the vanes 50 to provide the optimum angle of gas entry for the full range of engine speeds or throttle positions. Referring to FIGURE 9, curve A shows a typical blade or vane angle vs. engine speed $N_G$ (or equivalently, throttle position T if transients are discounted) performance curve. Horizontal line curve B represents a reverse or negative blade position for engine braking. Dashed line curve C represents an optional acceleration curve to achieve more rapid engine acceleration.

In order to provide for positioning vanes 50 there is shown a vane actuator generally designated at 60 contained in a housing 62 and having a movable output piston rod connection 64 adapted to be mechanically connected to lever 52 by any suitable connection indicated by dashed line 66 for positioning engine movable vanes 50. Hydraulic fluid pressure is supplied by inlet conduit 68 containing control fluid pressurizing pump 70. Return or drain fluid is returned from actuator 60 via outlet conduit 72.

The several controlling inputs supplied to actuator 60 are: first, a throttle position input or manual operator's input by means of throttle lever 78 which for automotive application may be foot controlled as an accelerator pedal; second, a fluid pressure signal proportional to engine output speed (or vehicle speed) supplied by conduit 76 from pump 40 which as later described is used to initiate engine braking in conjunction with the position of throttle 78; a third, means to supply a high pressure signal indicating engine acceleration. The high pressure signal indicating engine acceleration is transmitted to actuator 60 by conduit 74 which is connected to engine 10 at the discharge side of compressor 16 for a high fluid pressure source. Conduit 74 includes a valve 71 maintained in a normally closed position by a controlling solenoid 73 so that high pressure air is blocked except when solenoid 73 is electrically actuated. Solenoid 73 is electrically connected to power source 75 and normally open switch 77. Switch 77 is controlled by pivoted lever 79 which when moved counterclockwise will close switch 77 opening valve 71 permitting high pressure air to flow to actuator 60. Engine 10 will have associated fuel control means for controlling the supply of fuel to nozzles 46 which includes an all-speed governor as for example in the type of fuel control described in commonly assigned U.S. Patent 2,581,275 issued January 1, 1952 to F. C. Mock. The governor portion of such a fuel control is here referenced by numeral 81 modified to include an abutment 83 on rod 85 in close proximity to lever 79. During engine acceleration rod 85 is moved upwardly since the engine is in an underspeed condition with the force of spring 87 exceeding that produced by flyweights 89. Upward movement of rod 85 causes abutment 83 to strike lever 79 moving it in a direction to close switch 77 and open valve 71. When the engine comes up to speed, the force from flyweight 89 overcomes or balances the force of spring 87 causing rod 85 to move downwardly deactivating the solenoid circuit. During decelerating conditions, the governor is in an overspeed condition with the force from flyweights exceeding that of spring 87 causing abutment 83 to move still further away from lever 79. It will be understood that governor 81 is selected as a preferred embodiment to supply an actuating signal since it is normally present in most prior art fuel controls and can be modified inexpensively to actuate a solenoid and thereby indicate acceleration. Many fuel controls also operate on the basis of providing a different fuel pressure range during acceleration (usually higher) and an alternate signal may be obtained by sensing the fuel pressure change and actuating a solenoid switch. An example of a fuel control of this latter type may be found in copending application Serial No. 48,202 filed August 8, 1960 in the name of H. L. McCombs, now Patent No. 3,105,354, and commonly assigned. Other sensing devices known in the art to discriminate between engine acceleration and other ranges of operation may, of course, also be used.

Referring more particularly to FIGURES 2 through 8, there are shown various section views of our vane actuator showing in detail a preferred form of the invention.

Throttle lever 78 supplying a primary actuator input is secured by clamping screw and bolt assembly 80 to input cam shaft 82 rotatably mounted in housing 62. A scheduling cam 84 which is formed from a sheet metal stamping is secured to input shaft 82 for rotation therewith. Cam 84 may be profiled to provide any desired operating characteristic or unique relationship between input lever position and vane angle such as that, for example, illustrated in curve A of FIGURE 9. A cam follower 86, FIGURES 2 and 4, is formed by a folded over sheet metal piece and is rotatably mounted on fixed pivot pin 88. A cam engaging roller 90 is held in position by opposite sides of follower 86 and causes follower 86 to move rotationally about pivot 88 in response to the changes in height of cam 84 during operating ranges when roller 90 is in contact with cam 84. Follower 86 has a pair of elongated projections 92, only one of which is shown in FIGURE 4, extending downwardly from pivot pin 88 in close proximity to piston ram 94 which is secured at one end to diaphragm 96 which is peripherally secured to housing 62 by a cover member 98. A spring member 100 is concentrically disposed around piston ram 94 and bears on one end against an interior wall 102 of housing 62 and on the other end against diaphragm 96 to urge the diaphragm against cover 98 as a stop. Conduit 74 transmitting compressor discharge pressure during engine accelerations is connected through cover 98 to the leftward facing side of diaphragm 96 so that diaphragm 96 and piston 94 are positioned in response to the difference in forces produced by compressor pressure and spring 100. Rightward movement of piston 94 is limited by pin stop 104 which is eccentrically secured to adjustable externally extending screw 106. During engine accelerations, piston 94 moves to the right under the influence of compressor pressure and contacts projections 92 of follower 86 rotating it counterclockwise lifting roller 90 off the surface of cam 84 to provide overriding control of follower 86 as indicated by curve C of FIGURE 9.

The upper portion of housing 62 as shown in FIGURE 2, contains a servo piston and pilot valve assembly which will now be described in detail. A first cylindrical chamber 110 is formed in housing 62 and has slidably disposed therein a differential area piston member 112 comprised of a piston land portion 114 slidably contacting the inner wall of chamber 110 and an elongated ram portion 116 having a smaller diameter than piston land 114 and extending along the longitudinal axis of chamber 110. Piston land 114 contains a groove 118 adapted to receive a well known seal, as for example of the O-ring type, to effectively subdivide chamber 110 into a first compartment 120 and a second compartment 122 on opposite sides of piston land 114. An annular cover 124 is secured by screws 126 to housing 62 closing first compartment 120. Cover 124 has a central opening 128 concentrically aligned with the walls of cylindrical chamber 110 and in sliding engagement with ram portion 116. Cover 124 includes fluid seals 130 and 132 and dust packing 134 to provide a fluid tight sliding connection with ram 116. Second compartment 122 is closed by cover plate 136 held in position by screw 138 and having a fluid seal 140.

A first cylindrical bore is formed transversely of chamber 110 and intersects second compartment 122 to form two axially aligned cylindrical bores 142 and 144 which project outward radially from compartment 122 and receive opposite ends of slide servo valve 146 (FIGURES 2 and 3). A second cylindrical bore is formed transversely of cylinder 110 and intersects second compartment 122 to form two axially aligned guide holes 148 and 150 for slidably receiving cam follower pin 152 (FIGURES 2 and 4) which is parallel to but a spaced distance from slide servo valve 146. The lower end of follower pin 152 extends through guide hole 148 where it contacts cam follower 86 so that pin 152 moves axially in response to movement of cam 84 or the overriding action of diaphragm 96 to provide the input movement for the piston and valve assembly.

Pin 152 is threaded over part of its length for receiving nut 154. Axial motion of pin 152 is transmitted to balance lever 156, having a pair of arms 158, 160 (FIGURE 5), to slide valve 146. Slide valve 146 has land projections 162, 164 which bracket arms 160 and 158. Balance lever 156 is pivotably mounted on pin 166 which in turn is held by mounting block 168 which has a hole 170 for receiving pin 152. A spring 172 is concentrically mounted on pin 152 and bears against housing 62 on one end and mounting block 168 on the other to provide a biasing force urging mounting block 168 against nut 154 for positive support and also for urging pin 152 into contact with cam follower 86.

The right end of piston 112 as viewed in FIGURE 3 is bored to provide a sloping cam surface 174 which extends generally axially of the piston member. Balance lever 156 extends to the left of pin 152 into the bore of piston 112 and has a ball follower 176 at its end which contacts cam surface 174. Slide valve 146 has a stepped diameter internal passage 178 for equalizing fluid pressure on opposite ends of the servo valve. The internal passage has a shoulder 180 which provides a seat for spring 182 which is confined on its other end by adjustable retainer 184 threadedly mounted in endcap 186 maintained in position by screws 188 and 190. Spring 182 biases slide valve 146 downwardly against arms 158, 160 of balance lever 156 urging it clockwise so that follower 176 positively contacts cam surface 174.

Slide servo valve 146 includes a pair of lands 192 and 194 at its lower end forming an annular chamber 196 in cylindrical bore 142. Inlet high pressure hydraulic fluid from the discharge side of pump 70 is delivered by conduit 68 to inlet passage 198, FIGURE 3, where it is supplied to annular chamber 196 and also to branch passage 200 which runs parallel to the longitudinal axis of piston 112. Branch passage 200 is connected by a short conduit 202 to first compartment 120 so that high pressure fluid is at all times contained in this compartment and acts over the small face of land portion 114 providing a force urging piston 112 to the right as viewed in FIGURE 2. Land 194 of slide servo valve 146 is operative at the intersection of bore 142 and cylindrical chamber 110 to control the flow of high pressure fluid from annular chamber 196 to second compartment 122 where it acts over the large surface of piston land 114 providing a force urging piston 112 to the left as viewed in FIGURE 2.

Another land 204 is formed on the upper end of slide servo valve 146 and is operative with land 164 to form an annular chamber 206 in bore 144 which is in communication with outlet passage 208 (FIGURE 3) which in turn is connected to conduit 72 which as shown in FIGURE 1 is connected to the lower pressure or inlet side of pump 70. The upper edge of land 164 is operative with the intersection of bore 144 and cylindrical chamber 110 to control the flow of hydraulic fluid from second compartment 122 through annular chamber 206 to discharge or outlet passage 208. By positioning the slide valve axially, lands 194 and 164 jointly control the inlet and discharge of hydraulic fluid in second compartment 122 and thus controls the pressure level therein to a desired value between the limits of pump discharge and inlet pressures. First compartment 120 on the other hand always is maintained at a high pressure pump discharge pressure.

On considering the operation of the servo valve and piston assembly in response to variation in input signal applied to pin 152, it should be first noted that a specific area difference or ratio exists on opposite sides of land portion 114 which is exposed to fluid pressure in compartments 120 and 122 due to the presence of area of ram portion 116. In other words, the area over which fluid pressure in compartment 120 acts is smaller than the area that fluid pressure in compartment 122 acts on the piston. Because of this area difference at force balance or "null" condition of piston 112, the fluid pressure in compartment 122 must be less than that in compartment 120. Thus at "null" condition, lands 194 and 164 permit hydraulic fluid to circulate into compartment 122, sufficiently to equal this required null pressure. If now pin 152 is displaced upwardly by movement of follower 86, nut 154 will cause mounting block 168 to move upwardly against the biasing force of spring 172. Pin 166 of balance lever 156 is also moved upwardly causing balance lever 156 to rotate counterclockwise about ball follower 176 moving arms 158, 160 and slide valve 146 upwardly against the force of spring 182 as viewed in FIGURE 2. As servo valve 146 moves upwardly it increases the opening for high pressure fluid past land 194 and decreases the discharge opening past land 164 increasing pressure in chamber 122 above its null value. This action causes a force unbalance across land portion 114 of piston 112 moving said piston leftwardly within cylindrical chamber 110. As piston 112 moves leftwardly, cam surface 174 moves therewith permitting ball follower 176 to move upwardly with the sloping cam surface and thus rotating balance beam 156 clockwise. Clockwise movement of balance beam 156 permits spring 182 to urge slide servo valve 146 back towards its null position. Piston 112 will continue to move until servo valve 146 has fully returned to its null position at which point the fluid pressures across piston land 114 will again cause a force balance and no further motion will result until the next change in input signal.

Downward movement of follower pin 152 would cause substantially the reverse of the action described where pressure in compartment 122 would fall, piston 112 would move to the right, and a restoring motion by cam surface 174 would bring servo valve 146 back to its null position.

It should be noted that the piston and servo valve assembly provide an exceptionally compact arrangement whereby separate parts for a feedback cam and associated driving linkages are not required. Further, by mounting servo valve 146 transversely of the cylinder bore 110 and projecting through the compartment 122 separate servo openings are not required which avoids several expensive precision machining steps over prior art actuators providing a low cost yet highly accurate actuator.

For most ranges of movement the actuator will be positioned in response to movement of cam follower 86 which in turn is positioned either by cam 84 or diaphragm 96. Cam 84 may be contoured as indicated by curve A of FIGURE 9 to provide that or any other desired relationship between throttle position (equivalently accelerator pedal position or compressor speed when the engine is controlled by standard speed governor) and blade position. For some engines it may be undesirable to permit the actuator to open the turbine blades during an engine acceleration as this may retard the engine acceleration. For such engines, a diaphragm 96 is provided to override the action of cam 84. For example, when throttle 78 is rapidly advanced to a high setting, governor 81 is momentarily at an underspeed condition opening valve 71 and permitting high pressure air to be applied to diaphragm 96 moving ram 94 to the right until it abuts eccentric stop 104. This action rotates follower 86, lifting roller 90 off cam 84 so that follower pin 152 follows curve C of FIGURE 9 rather than curve A which would otherwise be scheduled by cam 84. As the engine comes up to speed, flyweights 89 overcome the force of spring 87 closing valve 71 permitting diaphragm 96 and ram 94 to return to the left under the influence of spring 100. Follower 86 is then released so that roller 90 again contacts cam 84. The point D in FIGURE 9 represents the blade position at high throttle setting which during the acceleration just described would be obtained by traversing curve C. It should be recognized that intermediate points on curve A would also be obtained in the same manner by part throttle advancements.

A further object of our actuator is to provide for engine braking by placing engine blades 50 in a negative or reverse position to aid in high speed deceleration. During decelerations, the engine operator retards the throttle which without additional means would cause the blade position to follow curve A. It is desired instead that on deceleration the blades quickly move to a negative position as indicated by curve B.

Braking action is accomplished by means of a braking cam 210, FIGURES 3, 6, 7, and 8 having an enlarged opening 212 receiving cam shaft 82. A cam mounting plate 214 is secured to shaft 82 for rotation therewith and includes an off-center bent over projection 216 which projects through an opening 218 formed near the edge of the braking cam. Bent over projection 216 provides a pivot point about which cam 210 can rotate within the limits provided by slot 212. A spaced distance below cam 210 there is located in aligned relationship a speed piston 220 slidably mounted within a cylindrical plug member 222 threadedly secured to housing 62. Plug 222 has an opening 224 for receiving conduit 76 containing fluid pressure proportional to engine output or vehicle speed which is supplied to the interior chamber 226. FIGURE 3 illustrates the braking cam 210 position for a high throttle setting whereas FIGURE 6 illustrates the cam position at idle or when the engine operator has removed his foot from the accelerator pedal. It will be observed that in a high throttle setting, cam 210 has ample clearance between slide valve 146 and does not affect its operation. In the idle position (with no pressure in chamber 226) illustrated in FIGURE 6, cam 210 is rotated into a position of contact with slide valve 146; but because of the resistance of spring 182 there is insufficient force to move the valve, and cam 210 is merely displaced downwardly about its pivot 216. Referring now to FIGURE 7, however, if cam 210 is in idle position at a high speed condition wherein the pressure in chamber 226 is sufficient to overcome the force of spring 182, cam 210 will pivot about its pivot 216 within the limit provided by the edge of slot 212, lifting servo valve 146 upwardly permitting high pressure past land 194 into compartment 122. The increase in pressure in compartment 122 drives piston 112 leftwardly to the end of its travel range, positioning blades 50 in a negative blade angle position, as indicated by curve B of FIGURE 9, whereby the flow of gases through blades 50 strike turbine 24 at a vector angle to oppose rotation and assist in the braking effort. FIGURE 8 illustrates the position of braking cam 210 and piston 220 under normal driving conditions where cam 210 is in a full power position and piston 220 has high pressure in chamber 226.

It will be noted that to obtain a braking position of blades 50 two conditions must be satisfied. First, cam 210 must be in an idle position and secondly, engine speed must be sufficiently high so that piston 220 overcomes the force of spring 182 on servo valve 146. For maximum engine braking assist, the force level of spring 182 is adjusted by retainer 184 to be greater than the force of piston 220 at idle speed, however, its value is established so as to be overcome by the force of piston 220 at speeds slightly greater than idle. Thus as the engine decelerates, braking will be maintained until idle speed is approached at which time spring 182 will move valve 146 to its null position (curve A) ready for the next engine acceleration.

It will be apparent that various changes and modifications may be made in the preferred embodiment of our invention described herein without departing from the scope of the invention defined in the following claims.

We claim:

1. An actuator comprising: a housing having an interior chamber formed therein; a hydraulic piston member slidably disposed in said chamber having a ram portion extending exteriorly thereof; a bore formed in said housing and extending transversely through said interior chamber adjacent one end thereof; a slide servo valve disposed in said bore and having land projections operative to control the area opening formed by the intersection of said bore and said interior chamber; a pressurized fluid source operative to supply control fluid to said bore; a movable balance beam connected to said servo valve to control the position thereof; input means connected to said balance beam to move said beam in response to input condition; said piston member having an axially extending cavity formed therein which defines a cam surface; said balance beam having an end extending into said cavity in contactive engagement with said cam surface and positioned thereby in response to the contour of said cam surface on movement of said piston member so that said servo valve is positioned as a combined function of input condition and piston position.

2. The combination of a gas turbine engine having a compressor driving turbine, an independent power output turbine, and variable position guide blades for controlling the directional flow of gas into said power turbine; an actuator connected to said variable position guide blades for controlling the position thereof, said actuator comprising: a hydraulic control fluid pressure responsive piston member adapted to be connected to said guide blades for controlling the position thereof; a servo valve member operative to control fluid pressure applied to said piston member and thereby control the movement of said piston member; a balance beam member interconnecting said piston member and said servo valve to control the position of said servo valve in response to piston movement; said balance beam including a movable pivot pin about which said beam is rotatable; a shaft member positionable in a rotational direction; a control throttle member secured to said shaft member for positioning said shaft rotationally in response to operator's demand; a cam member secured to said shaft for movement rotationally therewith; and cam follower means interconnecting said cam and said movable pivot pin so that said pivot pin and said servo valve are controlled in response to movement of the control throttle member, acceleration means operative to produce a high pressure control signal during engine acceleration; a pressure responsive member connected to said acceleration means and movable from a first to a second position in response to said high pressure acceleration signal; said pressure responsive means being connected to said cam follower means to override the controlling operation of said cam member during engine acceleration.

3. An actuator as claimed in claim 2 wherein said acceleration means includes a source of pressurized fluid, conduit means connecting said source with said pressure responsive member, valve means in said conduit means for controlling fluid flow therethrough, means responsive to compressor speed and the position of said control throttle member operatively connected to said valve means for actuating the same to an open position in response to a compressor speed request corresponding to the position of said control throttle member in excess of existing compressor speed.

4. An actuator as claimed in claim 3 wherein said valve means is actuated to a closed position by said last named means in response to compressor speed reaching the requested speed.

5. An actuator as claimed in claim 3 wherein said means responsive to compressor speed and the position of said control throttle member includes a positionable member and first and second force output means operatively connected thereto for actuating the same, said first and second force output means being responsive to compressor speed and the position of said control throttle member, respectively, and arranged in opposing relationship.

6. The combination of a gas turbine engine having a compressor driving turbine, an independent power output turbine, and variable position guide blades for controlling the directional flow of gas into said power turbine; an actuator connected to said variable position guide blades for controlling the position thereof, said actuator comprising: a hydraulic fluid pressure responsive piston member; a servo valve member operative to control the position of said piston member in response to servo valve position; a balance beam member interconnecting said piston member and said servo valve to control the position of said servo valve in response to piston position; said balance beam including a movable pivot pin about which said beam is rotatable; a control throttle member connected to said pivot pin to control the position thereof in response to operator's demand and thereby position said servo valve; means responsive to the speed of said engine power turbine; a braking cam member connected to said throttle member and said means responsive to engine speed operative to override the control of said balance beam and control the position of said servo valve member during engine braking.

7. An actuator as claimed in claim 6 including resilient means operative to load said servo valve member and wherein said means responsive to the speed of said engine power turbine includes a source of fluid, a pressure responsive member, a conduit connecting said source and said pressure responsive member, and fluid pressurizing means operatively connected to and driven by said engine power turbine for pressurizing said source of fluid in accordance with engine power turbine speed, said pressure responsive member.

References Cited by the Examiner
UNITED STATES PATENTS

| | | | |
|---|---|---|---|
| 1,512,804 | 10/24 | Roucka | 91—384 |
| 2,339,592 | 1/44 | Wenander | 91—384 |
| 2,766,732 | 10/56 | Schultz | 91—384 |
| 3,044,262 | 7/62 | Chadwick | 60—39.16 |
| 3,046,738 | 7/62 | Jackson | 60—39.25 |
| 3,075,350 | 1/63 | McCombs | 91—384 |
| 3,103,785 | 9/63 | Williams | 60—39.25 |

SAMUEL LEVINE, *Primary Examiner.*